(12) United States Patent
Nakano

(10) Patent No.: US 10,620,409 B2
(45) Date of Patent: Apr. 14, 2020

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Masatsugu Nakano, Utsonomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 146 days.

(21) Appl. No.: 15/592,477

(22) Filed: May 11, 2017

(65) Prior Publication Data

US 2017/0336607 A1    Nov. 23, 2017

(30) Foreign Application Priority Data

May 19, 2016   (JP) ................................. 2016-100251

(51) Int. Cl.
  *G02B 13/14*   (2006.01)
  *G02B 9/64*    (2006.01)

(52) U.S. Cl.
  CPC ............. *G02B 13/146* (2013.01); *G02B 9/64* (2013.01)

(58) Field of Classification Search
  CPC ...... G02B 13/146; G02B 13/00; G02B 13/14; G02B 13/143; G02B 9/04–64; G02B 13/04; G02B 13/008; G02B 13/009; G02B 15/161; G02B 15/177
  See application file for complete search history.

(56) References Cited

U.S. PATENT DOCUMENTS

| 2012/0200940 A1* | 8/2012 | Ohmoto | G02B 15/142 359/683 |
| 2013/0329305 A1* | 12/2013 | Kunugise | G02B 15/177 359/691 |
| 2015/0054988 A1* | 2/2015 | Kimura | G02B 13/04 359/680 |
| 2015/0212303 A1* | 7/2015 | Ohashi | G02B 13/009 359/688 |
| 2016/0077314 A1* | 3/2016 | Nishimura | G02B 13/06 359/708 |
| 2016/0306147 A1 | 10/2016 | Nakano | |
| 2017/0242222 A1* | 8/2017 | Aoi | G02B 13/0045 |

FOREIGN PATENT DOCUMENTS

| JP | H04-26813 A | 1/1992 |
| JP | 2004-354829 A | 12/2004 |
| JP | 2011-128273 A | 6/2011 |

* cited by examiner

*Primary Examiner* — William R Alexander
*Assistant Examiner* — Alberto J Betancourt
(74) *Attorney, Agent, or Firm* — Carter, DeLuca & Farrell LLP

(57) ABSTRACT

Provided is an optical system including, in order from an object side to an image side, a first lens unit having a negative refractive power, an aperture stop, and a second lens unit having a positive refractive power, in which an average value $\theta IR(G2p)_{AVE}$ of partial dispersion ratios of materials of positive lenses included in the second lens unit and an average value $\theta IR(G2n)_{AVE}$ of partial dispersion ratios of materials of negative lenses included in the second lens unit are appropriately set, provided that BF and F are a backfocus and a focal length of the optical system at a wavelength of 1050 nm, respectively, and a partial dispersion ratio of a material is $\theta=(Ns-Nm)/(Ns-Nl)$, where Ns, Nm, and Nl are refractive indices of the material at wavelengths of 400 nm, 1050 nm, and 1700 nm, respectively.

6 Claims, 4 Drawing Sheets

OPTICAL SYSTEM AND IMAGE PICKUP APPARATUS INCLUDING THE SAME

BACKGROUND OF THE INVENTION

Field of the Invention

The present invention relates to an optical system and particularly to an optical system preferable as an imaging optical system used in image pickup apparatuses such as a monitoring camera, a digital camera, a video camera, and a broadcast camera.

Description of the Related Art

In recent years, there has been a demand that an imaging optical system used in image pickup apparatuses such as a monitoring camera should achieve a wide angle of view, a preferable optical performance in imaging in both daytime and nighttime, and other characteristics. Generally, the monitoring camera uses visible light for the imaging in daytime and near-infrared light for the imaging in nighttime. The near-infrared light has such a favorable characteristic that in, for example, dense fog in which the visibility is low, imaging with the near-infrared light is less affected by scattering than imaging with the visible light. Accordingly, there is a demand that the imaging optical system to be used in a monitoring camera should support aberration corrections over a wide wavelength range from a visible range to a near-infrared range.

Conventionally, there is known an imaging optical system preferable for a monitoring camera which supports aberration corrections over the wide wavelength range from the visible range to the near-infrared range. Japanese Patent Application Laid-Open No. 2004-354829 discloses a fixed focal lens including, in order from an object side to an image side, a front lens group with a negative refractive power, an aperture stop, and a rear lens group with a positive refractive power. Japanese Patent Application Laid-Open No. 2011-128273 discloses a medium-telephoto imaging lens including a first group with a positive or negative refractive power, a second group with a positive refractive power, and a third group with a positive or negative refractive power.

An objective lens for a microscope is also known as an optical system in which various aberrations are well corrected over the wide wavelength range from the visible range to the near-infrared range. Japanese Patent Application Laid-Open No. H04-26813 discloses an objective lens for a microscope which includes, in order from an object side to an image side, a first lens unit with a negative refractive power and a second lens unit with a positive refractive power.

In many cases, an imaging optical system for a monitoring camera uses near-infrared light for imaging in nighttime. However, in times close to the new moon when the amount of moonlight is extremely low or in the case where the moon is hidden behind clouds, sufficient amount of near-infrared light cannot be obtained in some cases. Meanwhile, after being excited by sunlight, hydroxide ions in the atmosphere emit light called nightglow (peak wavelength of 1.6 μm). Excellent imaging can be easily performed even without moonlight by using this light.

In order to obtain a wide angle of view and an excellent optical performance over the wide wavelength range from the visible range to the near-infrared range in the imaging optical system for a monitoring camera, it is important to appropriately set the configurations of lenses forming the imaging optical system. For example, in the imaging optical system including, in order from the object side to the image side, the first lens unit with the negative refractive power, the aperture stop, and the second lens unit with the positive refractive power, appropriately setting the materials of the lenses forming the second lens unit is important to correct a chromatic aberration over the wide wavelength range in an excellent manner.

SUMMARY OF THE INVENTION

An object of the present invention is to provide an optical system which has a large aperture ratio and a wide angle of view and which has an excellent imaging performance for light over a wide wavelength range from a visible range to a near-infrared range.

An optical system of the present invention is an optical system comprising, in order from an object side to an image side, a first lens unit having a negative refractive power, an aperture stop, and a second lens unit having a positive refractive power, wherein conditional expressions of $$-0.015 < \theta IR(G2p)_{AVE} - \theta IR(G2n)_{AVE} < 0.015, \text{ and}$$

$$1.0 < BF/F$$

are satisfied, where

BF and F are a backfocus and a focal length of the optical system at a wavelength of 1050 nm, respectively, and $\theta IR(G2p)_{AVE}$ is an average value of partial dispersion ratios of materials of positive lenses included in the second lens unit, and $\theta IR(G2n)_{AVE}$ is an average value of partial dispersion ratios of materials of negative lenses included in the second lens unit, provided that a partial dispersion ratio of a material is $$\theta = (Ns - Nm)/(Ns - Nl),$$

where Ns is a refractive index of the material at a wavelength of 400 nm, Nm is a refractive index of the material at the wavelength of 1050 nm, Nl is a refractive index of the material at a wavelength of 1700 nm.

Further features of the present invention will become apparent from the following description of exemplary embodiments with reference to the attached drawings.

DESCRIPTION OF THE EMBODIMENTS

Preferred embodiments of an optical system of the present invention will now be described in detail in accordance with the accompanying drawings. An optical system of the present invention includes, in order from an object side to an image side, a first lens unit having a negative refractive power, an aperture stop, and a second lens unit having a positive refractive power.

Figure 1:
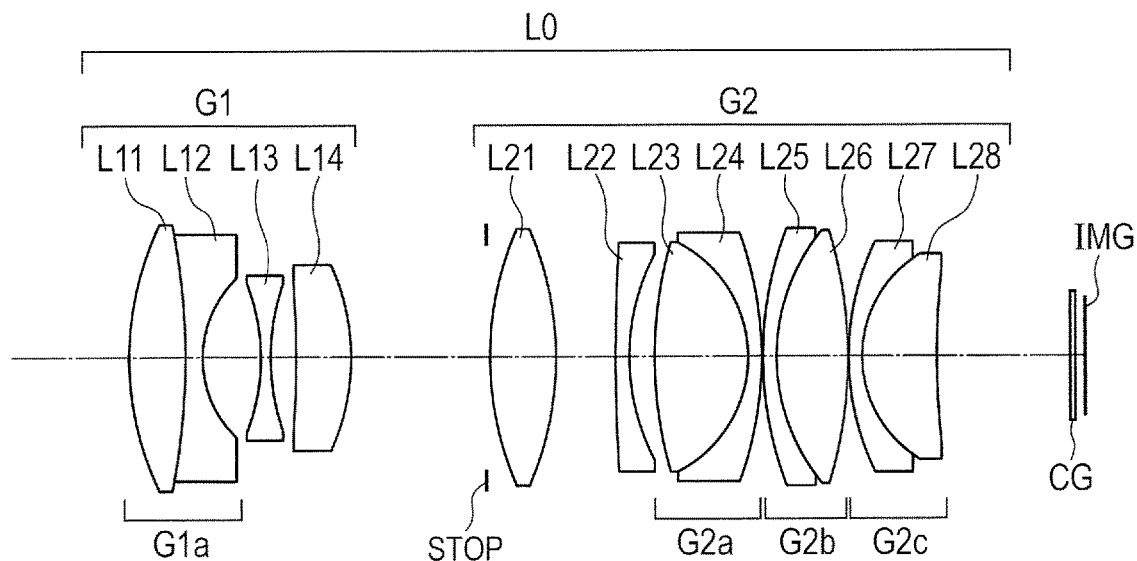
FIG. 1 is a lens cross-sectional view of an optical system in Embodiment 1.
Figure 2:
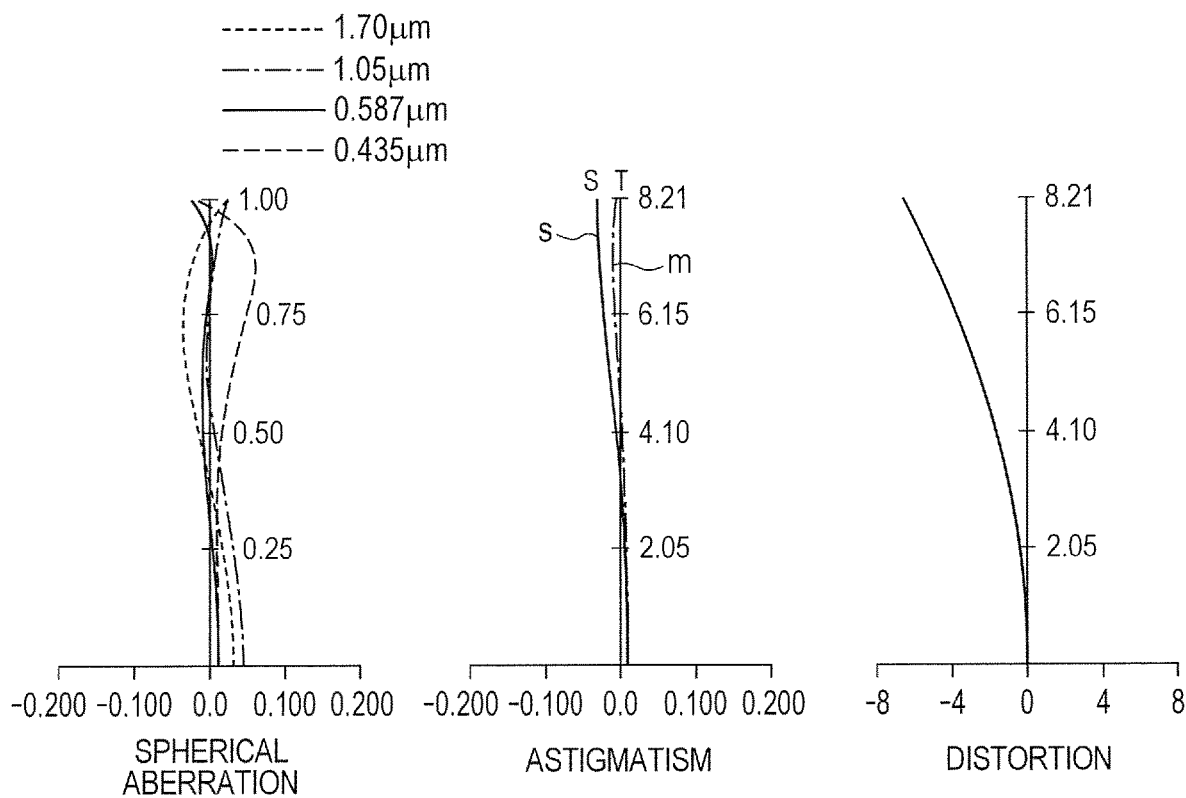
FIG. 2 includes graphs of various aberrations in the optical system of Embodiment 1.
Figure 3:
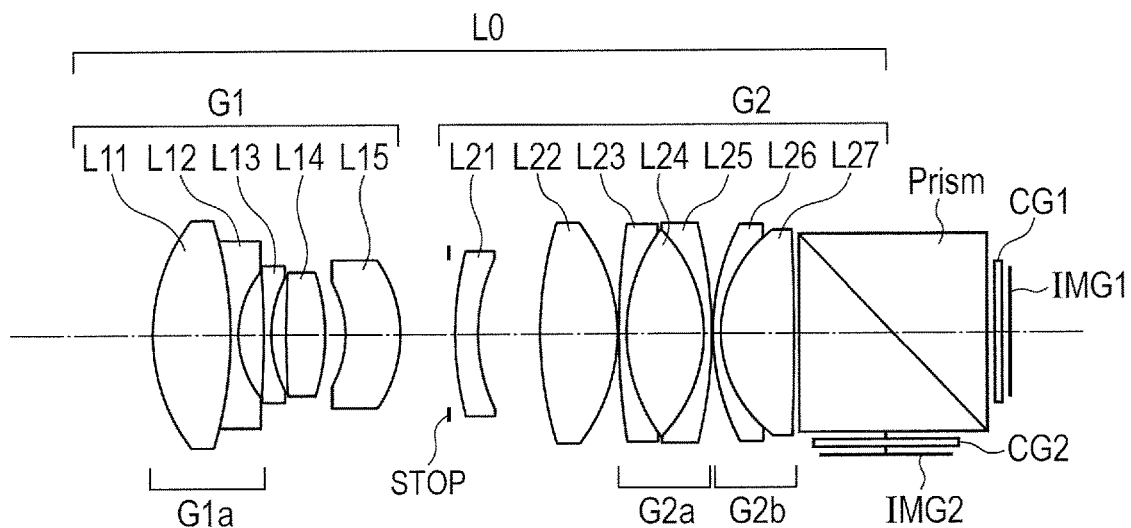
FIG. 3 is a lens cross-sectional view of an optical system in Embodiment 2.
Figure 4:
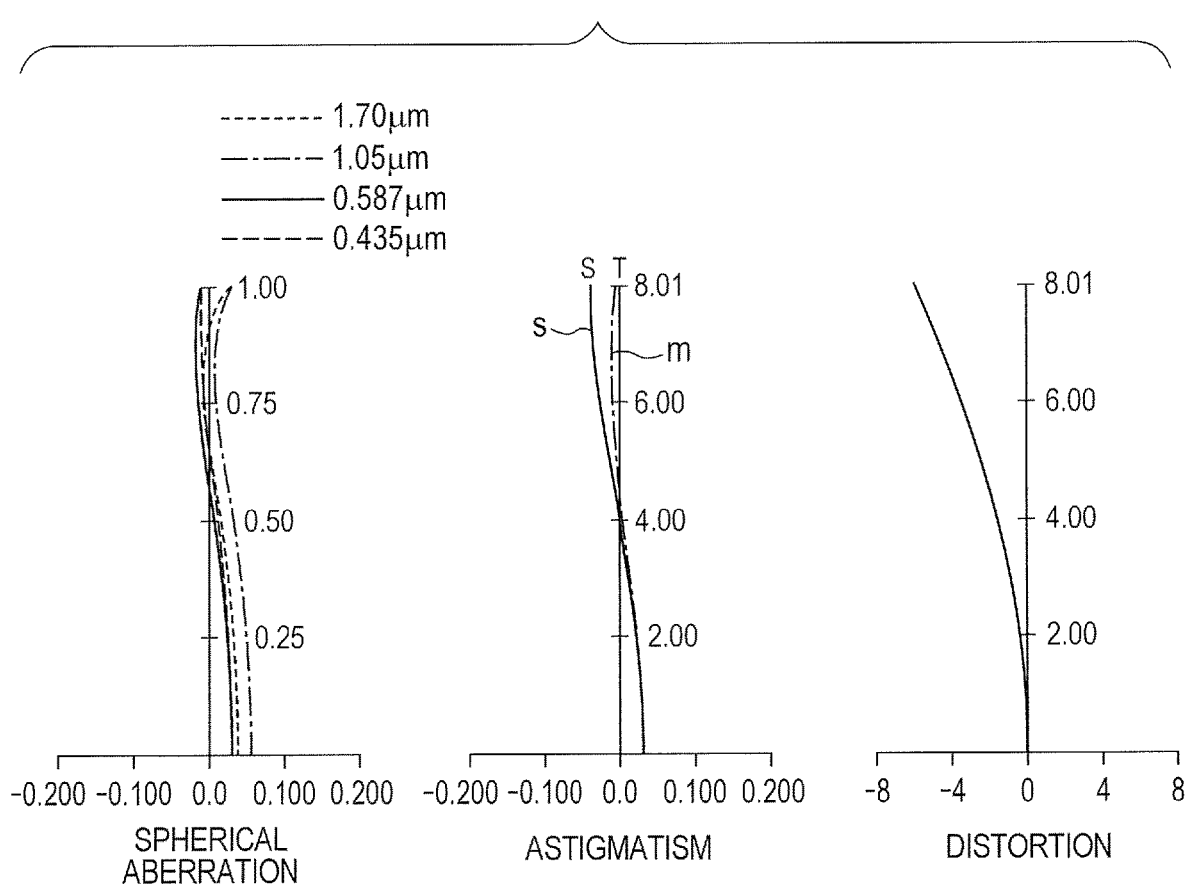
FIG. 4 includes graphs of various aberrations in the optical system of Embodiment 2.

FIG. 1 is a lens cross-sectional view of an optical system in Embodiment 1 of the present invention with the focus on infinity. FIG. 2 includes graphs of aberrations in the optical system in Embodiment 1 with the focus on infinity. A wavelength range in which the aberrations are corrected is a range from a wavelength of 400 nm to a wavelength of 1700 nm. FIG. 3 is a lens cross-sectional view of an optical system in Embodiment 2 of the present invention with the focus on infinity. FIG. 4 includes graphs of aberrations in the optical system in Embodiment 2 with the focus on infinity. A wavelength range in which the aberrations are corrected is a range from the wavelength of 400 nm to the wavelength of 1700 nm.

Figure 5:
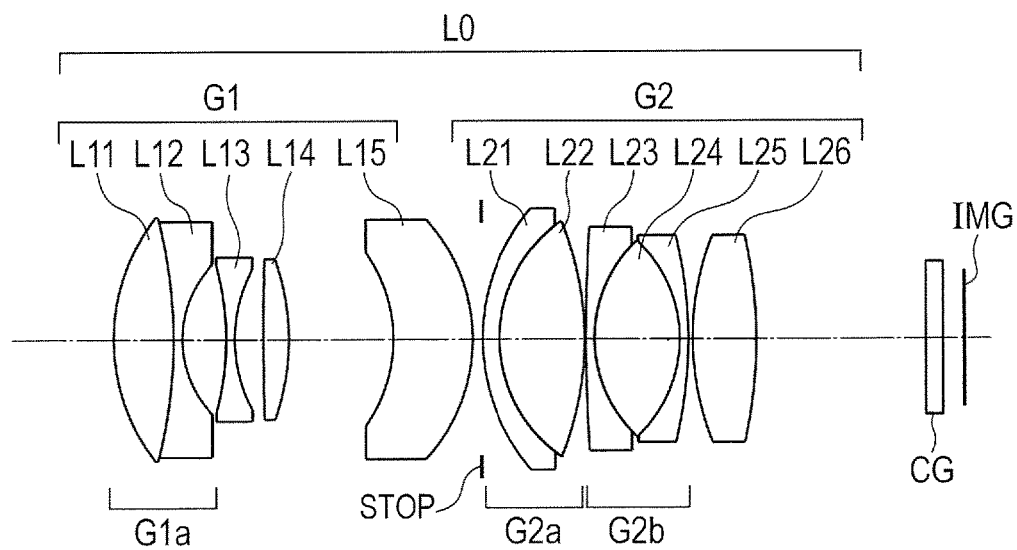
FIG. 5 is a lens cross-sectional view of an optical system in Embodiment 3.
Figure 6:
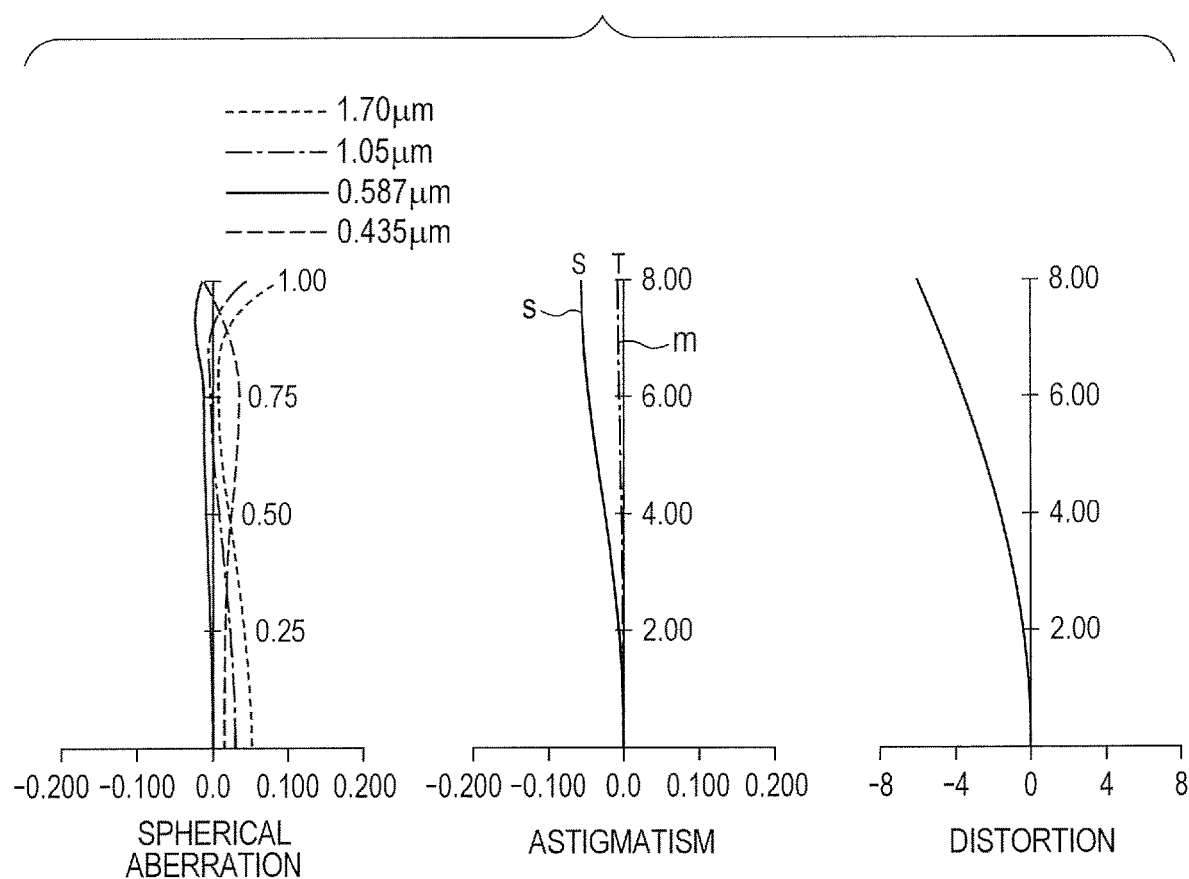
FIG. 6 includes graphs of various aberrations in the optical system of Embodiment 3.
Figure 7:
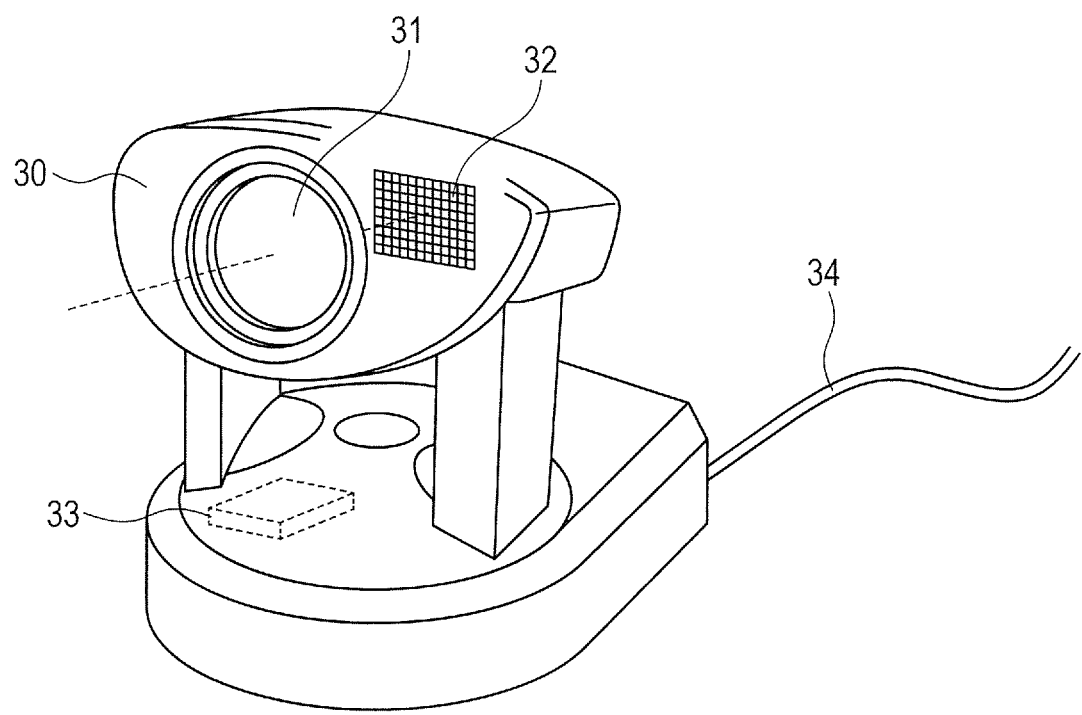
FIG. 7 is a schematic view of a main portion of an image pickup apparatus in the present invention.

FIG. 5 is a lens cross-sectional view of an optical system in Embodiment 3 of the present invention with focus on infinity. FIG. 6 includes graphs of aberrations in the optical system in Embodiment 3 with focus on infinity. A wavelength range in which the aberrations are corrected is a range from the wavelength of 400 nm to the wavelength of 1700 nm. FIG. 7 is a schematic view of a main portion of an image pickup apparatus including the optical system of the present invention.

In the lens cross-sectional views, the left side is the object side and the right side is the image side. In the lens cross-sectional views, L0 represents the optical system, G1 represents the first lens unit with the negative refractive power, STOP represents the aperture stop, and G2 represents the second lens unit with the positive refractive power. CG represents an optical block corresponding to an optical filter or the like. IMG represents an image plane, and a solid-state image pickup element (photoelectric conversion element) such as a CCD sensor or a CMOS sensor is disposed at the image plane IMG.

A graph depicting spherical aberrations out of the graphs depicting aberrations depicts aberrations related to wavelengths of 1700 nm, 1050 nm, 587 nm (d-line), and 435 nm (g-line). In a graph depicting astigmatism, m represents a meridional image plane at the wavelength of 587 nm, and S represents a sagittal image plane at the wavelength of 587 nm. Distortion is a value thereof at the wavelength of 587 nm. In the following description, lens configurations are described in order of arrangement from the object side to the image side, unless otherwise noted.

The optical system L0 of the present invention includes, in order from the object side to the image side, the first lens unit G1 with the negative refractive power, the aperture stop STOP, and the second lens unit G2 with the positive refractive power. Focusing is performed by moving the entire optical system L0. In the embodiments, BF and F represent a backfocus and a focal length of the optical system L0 at the wavelength of 1050 nm, respectively. The partial dispersion ratio of a material is $$\theta=(Ns-Nm)/(Ns-Nl) \quad (X1)$$

where Ns is the refractive index of the material at the wavelength of 400 nm, Nm is the refractive index of the material at the wavelength of 1050 nm, and Nl is the refractive index of the material at the wavelength of 1700 nm.

The average value of the partial dispersion ratios of materials of positive lenses included in the second lens unit G2 is represented by $\theta IR(G2p)_{AVE}$. The average value of the partial dispersion ratios of materials of negative lenses included in the second lens unit G2 is represented by $\theta IR(G2n)_{AVE}$. In this case, the conditional expressions $$-0.015<\theta IR(G2p)_{AVE}-\theta IR(G2n)_{AVE}<0.015 \quad (1),$$

$$1.0<BF/F \quad (2)$$

are satisfied.

Next, technical meanings of the aforementioned conditional expressions are described. The conditional expression (1) is used to correct an axial chromatic aberration and a lateral chromatic aberration in an excellent manner over a wide wavelength range from a visible range to a near-infrared range.

Particularly, the conditional expression (1) is an index for correcting the axial chromatic aberration and the lateral chromatic aberration at the wavelengths of 400 nm and 1700 nm in the positive and negative lenses included in the second lens unit G2 and also for estimating amounts of the axial chromatic aberration and the lateral chromatic aberration at the wavelength of 1050 nm which occur when the correction is performed. In other words, the conditional expression (1) is an index for estimating a secondary spectrum. In the combination of the positive and negative lenses, the smaller the index is, the smaller the amount of the secondary spectrum is. Accordingly, satisfying the range of the conditional expression (1) reduces the secondary spectrum and corrects the chromatic aberration in an excellent manner over the wide wavelength range from the visible range to the near-infrared range.

When the value falls below the lower limit or exceeds the upper limit in the conditional expression (1), the amount of the secondary spectrum occurring due to the axial chromatic aberration and the lateral chromatic aberration increases in the second lens unit G2, and the imaging performance becomes poor. Accordingly, this is not preferable. The conditional expression (2) relates to a ratio of the backfocus BF to the focal length F at the wavelength of 1050 nm. When the ratio falls below the lower limit in the conditional expression (2), the backfocus BF becomes so small that it is difficult to secure a space for inserting a prism for wavelength division or the like. It is more preferable that the ranges of the numeric values in the conditional expressions (1) and (2) are set as follows.

$$-0.014<\theta IR(G2p)_{AVE}-\theta IR(G2n)_{AVE}<0.010 \quad (1a),$$

$$1.02<BF/F \quad (2a)$$

According to the present invention, the factors are specified as described above to obtain an optical system which has an excellent imaging performance for light in the wide wavelength range from the visible range to the near-infrared range (wavelength of 400 to 1700 nm) and which has a large aperture ratio, a wide angle of view, and a long backfocus.

In the embodiments, it is further preferable that at least one of the following conditional expressions are satisfied. The Abbe number ν of the material is represented as $$\nu=(Nm-1)/(Ns-Nl) \quad (X2).$$

The average value of the Abbe numbers of the materials of the positive lenses included in the second lens unit G2 is represented by $\nu IR(G2p)_{AVE}$. The average value of the partial dispersion ratios of positive lenses included in the first lens unit G1 is represented by $\theta IR(G1p)_{AVE}$. The average value of the partial dispersion ratios of negative lenses included in the first lens unit G1 is represented by $\theta IR(G1n)_{AVE}$.

Half of an effective image pickup range of an imaging element in the case where the optical system of the present invention is used in an image pickup apparatus including the imaging element is represented by H. In this case, it is preferable that at least one of the following conditional expressions are satisfied.

$$18.0 < vIR(G2p)_{AVE} \quad (3)$$

$$-0.015 < \theta IR(G1p)_{AVE} - \theta IR(G1n)_{AVE} < 0.015 \quad (4)$$

$$0.2 < H/F \quad (5)$$

Next, technical meanings of the aforementioned conditional expressions are described. The conditional expression (3) relates to the average value of the Abbe numbers of the materials of all positive lenses included in the second lens unit G2, and is used to correct the various aberrations in an excellent manner. When the value falls below the lower limit in the conditional expression (3), the refractive powers of the positive and negative lenses included in the second lens unit G2 increase, and a large amount of a high-order aberration thereby occurs. Moreover, large amounts of the axial chromatic aberration and the lateral chromatic aberration occur due to the second lens unit G2, and correction of these aberrations is difficult.

In the optical system L0 of the present invention, the first lens unit G1 includes a partial system L1 in which a positive lens and a negative lens are arranged adjacent to each other. In this case, the conditional expression (4) relates to the partial dispersion ratios of the materials of the positive and negative lenses included in the first lens unit G1. When the value falls below the lower limit or exceeds the upper limit in the conditional expression (4), a large amount of the secondary spectrum occurs in the first lens unit G1 due to the axial chromatic aberration and the lateral chromatic aberration, and the optical characteristics becomes poor. According to the present invention, an optical system in which the various aberrations are corrected in an excellent manner over the wide wavelength range from the visible range to the near-infrared range can be obtained by employing the configuration described above.

The conditional expression (5) relates to a ratio of half of the effective image pickup plane of the imaging element in the case where the optical system of the present invention is employed in the image pickup apparatus to the focal length. When the ratio falls below the lower limit in the conditional expression (5), the size of the imaging plane of the imaging element becomes too small. This is not good in the case of a monitoring camera for monitoring because an observation area (angle of view of imaging) becomes small. It is more preferable that the numerical value ranges of the conditional expressions (3) to (5) are set as follows.

$$20.0 < vIR(G2p)_{AVE} \quad (3a)$$

$$-0.013 < \theta IR(G1p)_{AVE} - \theta IR(G1n)_{AVE} < 0.013 \quad (4a)$$

$$0.3 < H/F \quad (5a)$$

In the embodiments, the second lens unit G2 preferably includes, in order from the object side to the image side, a cemented lens obtained by cementing a positive lens and a negative lens, and a cemented lens obtained by cementing a negative lens and a positive lens. In addition, the second lens unit G2 preferably includes: a cemented lens obtained by cementing a negative lens, a positive lens, and a negative lens; and a cemented lens obtained by cementing a negative lens and a positive lens. Moreover, the first lens unit G1 preferably includes a cemented lens obtained by cementing a positive lens and a negative lens in this order from the object side to the image side.

Next, a lens configuration of the optical system in each embodiment is described.

[Embodiment 1]

An optical system L0 of Embodiment 1 is described. The optical system L0 of Embodiment 1 includes, in order from the object side to the image side, a first lens unit G1 having a negative refractive power, an aperture stop STOP configured to determine a predetermined aperture, and a second lens unit G2 having a positive refractive power. An optical block CG is disposed between the second lens unit G2 and an image plane IMG. The optical block CG may be omitted when unnecessary.

The first lens unit G1 includes, in order from the object side to the image side, four lenses of a lens L11 with a positive refractive power, a lens L12 with a negative refractive power, a lens L13 with a negative refractive power, and a lens L14 with a positive refractive power. The negative lens L11 and the positive lens L12 are cemented to form a cemented lens G1a. The second lens unit G2 includes the following lenses in order from the object side to the image side. The second lens unit G2 includes eight lenses of a lens L21 with a positive refractive power, a lens L22 with a negative refractive power, a lens L23 with a positive refractive power, a lens L24 with a negative refractive power, a lens L25 with a negative refractive power, a lens L26 with a positive refractive power, a lens L27 with a negative refractive power, and a lens L28 with a positive refractive power.

The positive lens L23 and the negative lens L24 are cemented to form a cemented lens G2a, the negative lens L25 and the positive lens L26 are cemented to form a cemented lens G2b, and the negative lens L27 and the positive lens L28 are cemented to form a cemented lens G2c.

[Embodiment 2]

An optical system L0 of Embodiment 2 is described. The optical system L0 of Embodiment 2 includes, in order from the object side to the image side, a first lens unit G1 with a negative refractive power, an aperture stop STOP configured to determine a predetermined aperture, and a second lens unit G2 with a positive refractive power. An optical prism Prism for wavelength division is disposed between the second lens unit G2 and image planes IMG, and wavelength selection is performed. One light divided by the wavelength division is focused on an image plane IMG1 and another light divided by the wavelength division is focused on an image plane IMG2.

An optical block CG1 is disposed between the optical prism Prism and the image plane IMG1, and an optical block CG2 is disposed between the optical prism Prism and the image plane IMG2. The optical block CG1 and the optical block CG2 may be omitted when unnecessary. The first lens unit G1 includes, in order from the object side to the image side, five lenses of a lens L11 with a positive refractive power, a lens L12 with a negative refractive power, a lens L13 with a negative refractive power, a lens L14 with a positive refractive power, and a lens L15 with a negative refractive power. The negative lens L11 and the positive lens L12 are cemented to form a cemented lens G1a.

The second lens unit G2 includes the following lenses in order from the object side to the image side. The second lens unit G2 includes seven lenses of a lens L21 with a negative refractive power, a lens L22 with a positive refractive power, a lens L23 with a negative refractive power, a lens L24 with a positive refractive power, a lens L25 with a negative refractive power, a lens L26 with a negative refractive power, and a lens L27 with a positive refractive power. The negative lens L23, the positive lens L24, and the negative lens L25 are cemented to form a cemented lens G2a, and the negative lens L26 and the positive lens L27 are cemented to form a cemented lens G2b.

[Embodiment 3]

An optical system L0 of Embodiment 3 is described. The optical system L0 of Embodiment 3 includes, in order from the object side to the image side, a first lens unit G1 with a negative refractive power, an aperture stop STOP configured to determine a predetermined aperture, and a second lens unit G2 with a positive refractive power. An optical block CG is disposed between the second lens unit G2 and an image plane IMG. The optical block CG may be omitted when unnecessary.

The first lens unit G1 includes, in order from the object side to the image side, five lenses of a lens L11 with a positive refractive power, a lens L12 with a negative refractive power, a lens L13 with a negative refractive power, a lens L14 with a positive refractive power, and a lens L15 with a negative refractive power. The positive lens L11 and the negative lens L12 are cemented to form a cemented lens G1a.

The second lens unit G2 includes the following lenses in order from the object side to the image side. The second lens unit G2 includes six lenses of a lens L21 with a negative refractive power, a lens L22 with a positive refractive power, a lens L23 with a negative refractive power, a lens L24 with a positive refractive power, a lens L25 with a negative refractive power, and a lens L26 with a positive refractive power. The negative lens L21 and the positive lens L22 are cemented to form a cemented lens G2a. The negative lens L23, the positive lens L24, and the negative lens L25 are cemented to form a cemented lens G2b.

Next, an example of a monitoring camera (image pickup apparatus) using the optical system of the present invention is described by using FIG. 7. In FIG. 7, reference numeral 30 represents a monitoring camera main body, 31 represents an imaging optical system including the optical system described in any of Embodiments 1 to 3, and 32 represents an image pickup element (photoelectric conversion element) such as a CCD sensor or a CMOS sensor which is incorporated in the camera main body and which receives light of an object image formed by the optical system 31. Reference numeral 33 represents a memory which stores information regarding object images subjected to photoelectric conversion by the image pickup element 32. Reference numeral 34 represents a network cable for transmitting the captured object images subjected to photoelectric conversion by the image pickup element 32.

Numerical value data related to each of Embodiments 1 to 3 are described below. In the numeral value data, i is the number of a surface in order from the object side, ri is the curvature radius of the i-th surface (unit: mm), di is a distance between the i-th surface and the (i+1)th surface (unit: mm). ndi and vdi are, respectively, the refractive index and the Abbe number of a material of an optical member between the i-th surface and the (i+1)th surface which are obtained by using the d-line (wavelength 587.6 nm) as a reference.

The Abbe number vd obtained by using the d-line as the reference is $$vd = (Nd-1)/(NF-Nc),$$

where NF is the refractive index of the material at the wavelength of 486 nm, Nd is the refractive index of the material at the wavelength of 587.6 nm, and Nc is the refractive index of the material at the wavelength of 656 nm.

The partial dispersion ratio θIR is defined by the expression (X1) described above. The Abbe number vIR is defined by the expression (X2) described above. The two surfaces closest to the image side in the numerical value data 1 and 3 and the four surfaces closest to the image side in the numerical data 2 are flat surfaces corresponding to the optical blocks (glass members). The refractive index of the glass members at the wavelength of 1050 nm is 1.50638. The values of the focal length and the backfocus BF are those at the wavelength of 1050 nm. Moreover, the relationships between the aforementioned conditional expressions and various numerical values in the embodiments are described in Table 1.

[Numerical Value Data 1]

| Surface number | r | d | nd | vd | vIR | θIR |
|---|---|---|---|---|---|---|
| 1 | 44.740 | 8.30 | 1.77250 | 49.60 | 13.12 | 0.7963 |
| 2 | −98.367 | 2.50 | 1.57135 | 52.95 | 14.23 | 0.8060 |
| 3 | 16.083 | 8.58 | | | | |
| 4 | −29.751 | 1.50 | 1.65844 | 50.88 | 13.79 | 0.8115 |
| 5 | 33.051 | 3.77 | | | | |
| 6 | −151.536 | 8.08 | 1.80100 | 34.97 | 9.61 | 0.8379 |
| 7 | −32.662 | 19.85 | | | | |
| 8 (stop) | ∞ | 0.50 | | | | |
| 9 | 46.877 | 9.70 | 1.49700 | 81.55 | 21.45 | 0.7835 |
| 10 | −46.877 | 8.86 | | | | |
| 11 | 277.614 | 2.00 | 1.61340 | 44.27 | 11.68 | 0.8007 |
| 12 | 32.139 | 3.73 | | | | |
| 13 | 60.316 | 13.78 | 1.43875 | 94.95 | 24.78 | 0.7771 |
| 14 | −18.709 | 2.00 | 1.61340 | 44.27 | 11.68 | 0.8007 |
| 15 | −52.098 | 0.15 | | | | |
| 16 | 52.392 | 2.00 | 1.61340 | 44.27 | 11.68 | 0.8007 |
| 17 | 28.844 | 10.55 | 1.59522 | 67.74 | 18.36 | 0.8042 |
| 18 | −62.106 | 0.15 | | | | |
| 19 | 37.790 | 2.00 | 1.51633 | 64.14 | 15.81 | 0.7493 |
| 20 | 17.487 | 11.00 | 1.43875 | 94.95 | 24.78 | 0.7771 |
| 21 | 119.675 | 19.02 | | | | |
| 22 | ∞ | 0.50 | 1.51633 | 64.14 | 15.81 | 0.7493 |
| 23 | ∞ | 1.43 | | | | |
| 24 (Image plane) | ∞ | | | | | |

| Focal length | 18.52 |
|---|---|
| Fno | 1.20 |
| Image height | 8.2 |
| BF | 20.78 |

[Numerical Value Data 2]

| Surface number | r | d | nd | vd | vIR | θIR |
|---|---|---|---|---|---|---|
| 1 | 24.860 | 10.00 | 1.74100 | 52.64 | 13.66 | 0.7828 |
| 2 | −51.070 | 1.00 | 1.64850 | 53.02 | 14.18 | 0.8030 |
| 3 | 13.249 | 3.26 | | | | |
| 4 | −117.854 | 1.00 | 1.64850 | 53.02 | 14.18 | 0.8030 |
| 5 | 16.150 | 1.92 | | | | |
| 6 | 139.885 | 5.00 | 1.79952 | 42.23 | 11.55 | 0.8235 |
| 7 | −26.679 | 2.64 | | | | |
| 8 | −14.086 | 7.00 | 1.75700 | 47.82 | 12.62 | 0.7971 |
| 9 | −17.407 | 6.00 | | | | |
| 10 (stop) | ∞ | 0.97 | | | | |
| 11 | 42.208 | 3.00 | 1.51633 | 64.14 | 15.81 | 0.7493 |
| 12 | 22.786 | 7.96 | | | | |
| 13 | 49.524 | 10.00 | 1.49700 | 81.55 | 21.45 | 0.7835 |
| 14 | −23.795 | 0.15 | | | | |
| 15 | 93.809 | 1.00 | 1.61340 | 44.27 | 11.68 | 0.8007 |
| 16 | 22.796 | 10.00 | 1.49700 | 81.55 | 21.45 | 0.7835 |
| 17 | −19.427 | 1.00 | 1.61340 | 44.27 | 11.68 | 0.8007 |
| 18 | −58.668 | 0.15 | | | | |
| 19 | 30.859 | 1.00 | 1.64000 | 60.08 | 14.81 | 0.7505 |

-continued

[Numerical Value Data 2]

| | | | | | | |
|---|---|---|---|---|---|---|
| 20 | 16.853 | 9.45 | 1.49700 | 81.55 | 21.45 | 0.7835 |
| 21 | −330.628 | 0.50 | | | | |
| 22 | ∞ | 24.00 | 1.51633 | 64.14 | 15.81 | 0.7493 |
| 23 | ∞ | 1.00 | | | | |
| 24 | ∞ | 1.00 | 1.51633 | 64.14 | 15.81 | 0.7493 |
| 25 | ∞ | 1.00 | | | | |
| 26 (Image plane) | ∞ | | | | | |

| | |
|---|---|
| Focal length | 18.53 |
| Fno | 1.40 |
| Image height | 8.0 |
| BF | 19.10 |

[Numerical Value Data 3]

| Surface number | r | d | nd | vd | vIR | θIR |
|---|---|---|---|---|---|---|
| 1 | 22.959 | 7.07 | 1.72916 | 54.68 | 14.07 | 0.7769 |
| 2 | −55.794 | 1.00 | 1.61405 | 54.99 | 14.61 | 0.7974 |
| 3 | 12.536 | 5.22 | | | | |
| 4 | −32.779 | 1.00 | 1.61405 | 54.99 | 14.61 | 0.7974 |
| 5 | 17.401 | 3.35 | | | | |
| 6 | 353.694 | 3.00 | 1.80610 | 40.93 | 11.22 | 0.8268 |
| 7 | −27.690 | 12.23 | | | | |
| 8 | −17.606 | 9.34 | 1.76200 | 40.10 | 11.10 | 0.8362 |
| 9 | −20.534 | 1.00 | | | | |
| 10 (stop) | ∞ | 0.15 | | | | |
| 11 | 23.361 | 2.00 | 1.75700 | 47.82 | 12.62 | 0.7971 |
| 12 | 16.668 | 10.00 | 1.49700 | 8.15 | 21.45 | 0.7835 |
| 13 | −36.133 | 0.15 | | | | |
| 14 | 205.961 | 1.00 | 1.75700 | 47.82 | 12.62 | 0.7971 |
| 15 | 15.640 | 10.00 | 1.49700 | 81.55 | 21.45 | 0.7835 |
| 16 | −15.695 | 1.00 | 1.75700 | 47.82 | 12.62 | 0.7971 |
| 17 | −51.136 | 0.50 | | | | |
| 18 | 32.351 | 7.50 | 1.49700 | 81.55 | 21.45 | 0.7835 |
| 19 | −53.781 | 20.00 | | | | |
| 20 | ∞ | 2.00 | 1.51633 | 64.14 | 15.81 | 0.7493 |
| 21 | ∞ | 2.48 | | | | |
| 22 (Image plane) | ∞ | | | | | |

| | |
|---|---|
| Focal length | 18.74 |
| Fno | 1.40 |
| Image height | 7.5 |
| BF | 23.84 | accorded the broadest interpretation so as to encompass all such modifications and equivalent structures and functions.

This application claims the benefit of Japanese Patent Application No. 2016-100251, filed May 19, 2016, which is hereby incorporated by reference herein in its entirety.

What is claimed is:

1. An optical system comprising, in order from an object side to an image side:
   a first lens unit having a negative refractive power;
   an aperture stop;
   and a second lens unit having a positive refractive power, wherein the following conditional expressions are satisfied:

$-0.015 < \theta IR(G1p)_{AVE} - \theta IR(G1n)_{AVE} < 0.015$, $-0.015 < \theta IR(G2p)_{AVE} - \theta IR(G2n)_{AVE} < 0.015$, and $1.0 < BF/F$, where, when a refractive index of a material at a wavelength of 400 nm is Ns, a refractive index of the material at the wavelength of 1050 nm is Nm, a refractive index of the material at a wavelength of 1700 nm is Nl, and a partial dispersion ratio of the material is $\theta IR = (Ns-Nm)/(Ns-Nl)$, BF and F represent a backfocus and a focal length of the optical system at a wavelength of 1050 nm, respectively, $\theta IR(G1p)_{AVE}$ represents an average value of partial dispersion ratios of materials of positive lenses included in the first lens unit, $\theta IR(G1n)_{AVE}$ represents an average value of partial dispersion ratios of materials of negative lenses included in the first lens unit, $\theta IR(G2p)_{AVE}$ represents an average value of partial dispersion ratios of materials of positive lenses included in the second lens unit, and $\theta IR(G2n)_{AVE}$ represents an average value of partial dispersion ratios of materials of negative lenses included in the second lens unit.

2. The optical system according to claim 1, wherein the following conditional expression is satisfied:

$18.0 < vIR(G2p)_{AVE}$, where, when an Abbe number of a material is $v=(Nm-1)/(Ns-Nl)$, $vIR(G2p)_{AVE}$ represents an average value of Abbe numbers of the materials of the positive lenses included in the second lens unit.

3. The optical system according to claim 1, wherein the second lens unit includes a first positive lens, a first negative

TABLE 1

| Conditional Expression | Parameter | Embodiment 1 | Embodiment 2 | Embodiment 3 |
|---|---|---|---|---|
| | θIR(G2p)$_{AVE}$ | 0.7854 | 0.7835 | 0.7835 |
| | θIR(G2n)$_{AVE}$ | 0.7878 | 0.7753 | 0.7971 |
| | BF | 20.78 | 19.10 | 23.84 |
| | F | 18.52 | 18.53 | 18.74 |
| | vIR(G2p)$_{AVE}$ | 22.34 | 21.45 | 21.45 |
| | θIR(G1p)$_{AVE}$ | 0.8171 | 0.8031 | 0.8018 |
| | θIR(G1n)$_{AVE}$ | 0.8087 | 0.8010 | 0.8103 |
| | H | 8.2 | 8.0 | 7.5 |
| (1)θIR(G2p)$_{AVE}$ − θIR(G2n)$_{AVE}$ | | −0.0024 | 0.0082 | −0.0136 |
| (2)BF/F | | 1.13 | 1.03 | 1.29 |
| (3)vIR(G2p)$_{AVE}$ | | 22.34 | 21.45 | 21.45 |
| (4)θIR(G1p)$_{AVE}$ − θIR(G1n)$_{AVE}$ | | 0.0084 | 0.0021 | −0.0085 |
| (5)H/F | | 0.44 | 0.43 | 0.40 |

While the present invention has been described with reference to exemplary embodiments, it is to be understood that the invention is not limited to the disclosed exemplary embodiments. The scope of the following claims is to be lens arranged at the image side of the first positive lens, a second negative lens, and a second positive lens arranged at the image side of the second negative lens, the first positive lens and the first negative lens being cemented to each other, and the second negative lens and the second positive lens being cemented to each other.

4. The optical system according to claim 1, wherein the first lens unit includes a positive lens and a negative lens arranged at the image side of the positive lens, the positive lens and the negative lens being cemented to each other.

5. An image pickup apparatus, comprising:
   the optical system according to claim 1; and
   an image pickup element configured to receive an image formed by the optical system.

6. The image pickup apparatus according to claim 5, wherein the following conditional expression is satisfied:

$$0.2 < H/F,$$

where H represents half of an effective image pickup range of the image pickup element.

* * * * *